Patented May 22, 1951

2,554,193

UNITED STATES PATENT OFFICE 2,554,193

ORGANOPOLYSILANES

Melvin J. Hunter, Midland, Mich., assignor to Dow Corning Corporation, Midland, Mich., a corporation of Michigan No Drawing. Application December 15, 1948, Serial No. 65,509

2 Claims. (Cl. 260—448.2)

The present invention relates to the production of organosilanes and in particular, involves the reaction of organochlorosilanes with sodium to produce organopolysilanes.

Heretofore, Kipping has shown that when diphenyldichlorosilane is reacted with sodium, he obtained five products, three of which were crystalline, one a nearly colorless, slightly gelatinous powder and one a glue-like, readily soluble mass.

I have prepared polysilanes by reacting dimethyldichlorosilane with metallic sodium. In this preparation 400 grams of xylene and 92 grams of metallic sodium were placed in a flask and heated until the xylene was refluxing. Then a 240 cc. portion of dimethyldichlorosilane was added gradually over a period of three days while the mixture was being stirred and refluxed. Five grams of sodium were then gradually added to the reaction mixture, and the refluxing continued for four days more. After filtering and washing with hot toluene, a bluish purple solid remained on the filter. The solid was washed with ethyl alcohol to remove sodium and then with water which removed the blue coloration. This solid was a white powder, had a melting point of greater than 237° C., and was insoluble in all common solvents such as concentrated nitric acid, concentrated sulfuric acid, sodium hydroxide, benzene, ethyl alcohol, methylethylketone, 2-ethyl hexanol, amyl acetate, pyridine, methylene chloride, and 1-4 dioxane.

The xylene filtrate of the reaction product was strip distilled and a small portion of waxy material remained which had a melting point of 48° C. This wax-like material was soluble in all of the common solvents. When a small portion of this wax-like material was heated for a time, the residue appeared to have an increasingly higher melting point.

About three times as much by weight of the white powder was produced as of the wax-like material.

Objects of the present invention are to provide an improved process for the production of solid, wax-like, soluble, polysilane products and to provide novel polysilanes. Other objects and advantages of the present invention will be apparent from the following description and the subjoined claims.

In accordance with the present invention a mixture of dimethyldichlorosilane and trimethylchlorosilane in liquid phase is reacted with an alkali metal to produce solid, soluble products.

Any alkali metal may be effectively utilized though sodium or potassium is preferred due to their commercial availability. The alkali metal is employed in amount at least equivalent to the chlorine present in the chlorosilane reactants. The alkali metal should be in a finely divided state in order to promote the production of a high yield. To assist in securing fine division a diluent may be used. The alkali metal may be either finely divided, molten, alkali metal or finely divided, suspended, solid, alkali metal. If desired the eutectic alloy of sodium and potassium may be employed.

The reactants, dimethyldichlorosilane and trimethylchlorosilanes, are in mixture when contacted with the alkali metal. The trimethylchlorosilane when in mixture with dimethylchlorosilane modifies the products formed. The molar proportion of this trimethylchlorosilane may vary from 5 to 50 percent of the total mixture, with the dimethyldichlorosilane varying from 95 to 50 percent of the total mixture. When the proportion of the trimethylchlorosilane is between 5 to 30 percent, high molecular weight polymers are obtained. Above 30 percent, lower molecular weight polymers are obtained. With such a product it may be desirable to strip off the lower boiling materials.

The two chlorosilanes are first mixed together. The silanes then may be added to the finely divided alkali metal suspended in a solvent boiling above the melting point of alkali metal at the operating pressure, such as toluene or xylene. Another specific mode of employment of the present invention is to mix a finely divided, solid, suspended, alkali metal and the chlorosilane mixture, previously prepared as indicated above.

After the reaction is complete, the product is filtered and thoroughly washed to remove any traces of alkali metal or alkali metal chloride.

The filtrate of the reaction product upon stripping yields a large proportion of a wax-like polysilane. This material was wax-like at room temperature, was quite slippery to the touch, and had a cream color. This material was soluble in xylene and of the general formula

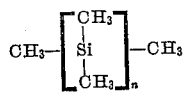

where $n$ has a value of at least three.

When the filter cake is washed with water, there remains a small proportion of a white powder which is insoluble in all common solvents, such as, concentrated nitric acid, concentrated sulfuric acid, benzene and ethyl alcohol. This powder may be employed as a stable thickening agent for siloxane fluids.

Example

Sodium in amount of 89.2 parts by weight was added gradually to 400 parts of xylene and heated to reflux. A mixture of 211.5 parts of dimethyldichlorosilane and 44.5 parts of trimethylchlorosilane, by ratio, 4 mols of $(CH_3)_2SiCl_2$ per mol of $(CH_3)_3SiCl$, was then gradually added over a period of three days. The mixture was allowed to reflux for a total of four days. The reaction mixture was filtered and then washed with hot xylene.

A considerable quantity of the wax-like product was recovered from the xylene filtrate by evaporating the xylene. The product was soluble in common solvents. This product also had a cream color and was quite slippery to the touch.

The filter cake was washed with alcohol and allowed to air dry. The white powder so obtained was insoluble in concentrated nitric acid, concentrated sulfuric acid, sodium hydroxide, benzene, ethyl alcohol, methylethylketone, 2-ethyl hexanol, amyl acetate, pyridine, methylene chloride, and 1-4 dioxane. However, when 2 percent of the powder was heated in white mineral oil, the powder went into solution and a grease-like product was obtained on cooling. Also, when the powder was heated in decahydronaphthalene a light brown solution resulted. The solution became cloudy and thickened when cooled.

That which is claimed is:

1. The process of preparing methylpolysilanes which comprises reacting a mixture of from 95 to 50 mol percent of dimethyldichlorosilane and from 5 to 50 mol percent of trimethylchlorosilane in liquid phase with an alkali metal, whereby a methylpolysilane having a wax-like consistency is produced.

2. The process in accordance with claim 1 in which the alkali metal is sodium.

MELVIN J. HUNTER.

REFERENCES CITED

The following references are of record in the file of this patent:

Rochow: "Chemistry of the Silicones," pages 45-46 (1946) John Wiley & Sons Inc., New York.